United States Patent [19]

Greene

[11] 3,914,560

[45] Oct. 21, 1975

[54] SELF-ADJUSTING REPEATER FOR VOICE FREQUENCY TELEPHONE TRANSMISSION SYSTEMS

[75] Inventor: Clifford E. Greene, Fort Worth, Tex.

[73] Assignee: Superior Continental Corporation, Hickory, N.C.

[22] Filed: Oct. 13, 1971

[21] Appl. No.: 188,914

[52] U.S. Cl. .......... 179/170 R; 179/16 F

[51] Int. Cl. .......... H04b 3/36

[58] Field of Search... 179/16 F, 81 A, 81 B, 170 R, 179/170.6, 170.8, 170 NC, 170 D, 170 T

[56] References Cited

UNITED STATES PATENTS

| | | | |
|---|---|---|---|
| 1,973,504 | 9/1934 | Pierrot | 179/170 D |
| 2,117,708 | 5/1938 | Davis | 179/170.8 |
| 2,818,470 | 12/1957 | Busala et al. | 179/81 A |
| 2,870,271 | 1/1959 | Cronburg | 179/170 T |
| 3,187,104 | 6/1965 | Ebel | 179/16 F |
| 3,330,912 | 7/1967 | Koseki | 179/81 A |
| 3,578,914 | 5/1971 | Simonelli | 179/16 F |
| 3,602,648 | 8/1971 | Holtz | 179/81 A |
| 3,660,609 | 5/1972 | Tremblay | 179/16 F |
| 3,689,711 | 9/1972 | Earle | 179/170.6 |
| 3,781,481 | 12/1973 | Shaffer et al | 179/170 R |

*Primary Examiner*—Kathleen H. Claffy
*Assistant Examiner*—Alan Faber

[57] ABSTRACT

Disclosed is a telephone automatic gain control repeater for automatically adjusting a.c. signal gain to compensate for loop transmission loss. An embodiment of the disclosed repeater contains two hybrids, connected together through a controllable attenuator and an amplifier, the controllable attenuator having means for variably attenuating a.c. signals passing there through. One hybrid is connected to a transmission line; the other is connected to and passes a.c. signals from a telephone central office. The means for variably attenuating a.c. signals is responsive to a d.c. current flow through at least a portion of the controllable attenuator. A control means is provided for regulating the d.c. current flow in the controllable attenuator and bridges a resistive means in series with a transmission line. The control means is responsive to the voltage drop across the resistive means. When there is a decrease in voltage across the resistive means (increased resistance on the transmission line) the control means passes a proportionally decreased d.c. current flow through it and the controllable attenuator, thereby decreasing its attenuation to a.c. signals passing there through.

8 Claims, 8 Drawing Figures

CLIFFORD E. GREENE
INVENTOR.

BY Roy B. Morris
ATTORNEY

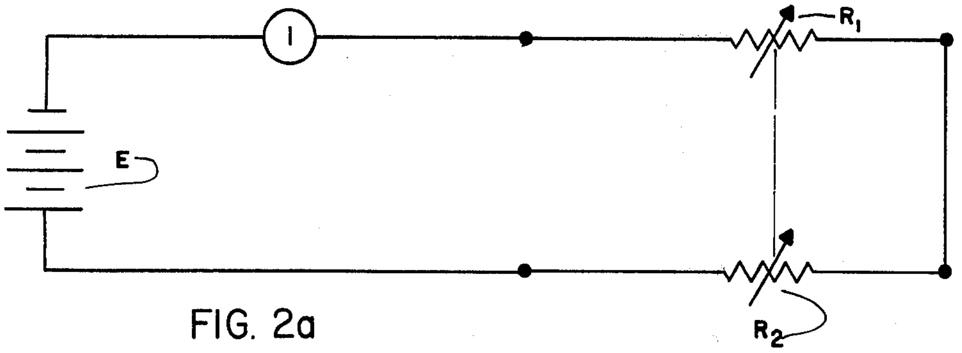
FIG. 2a
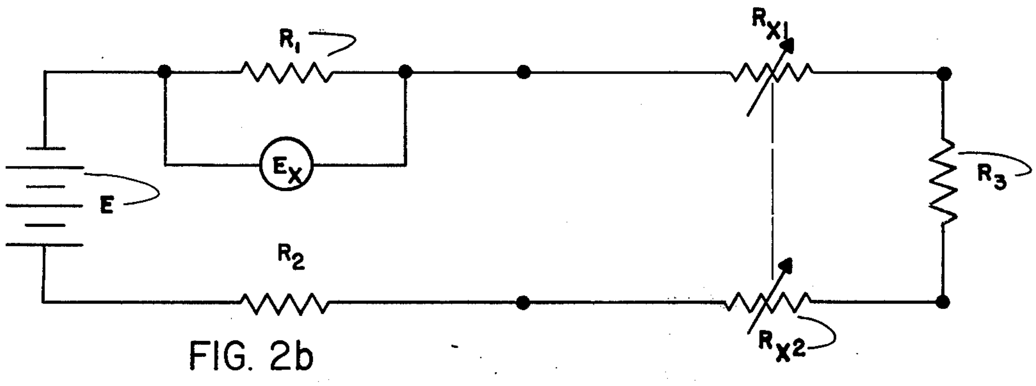
FIG. 2b
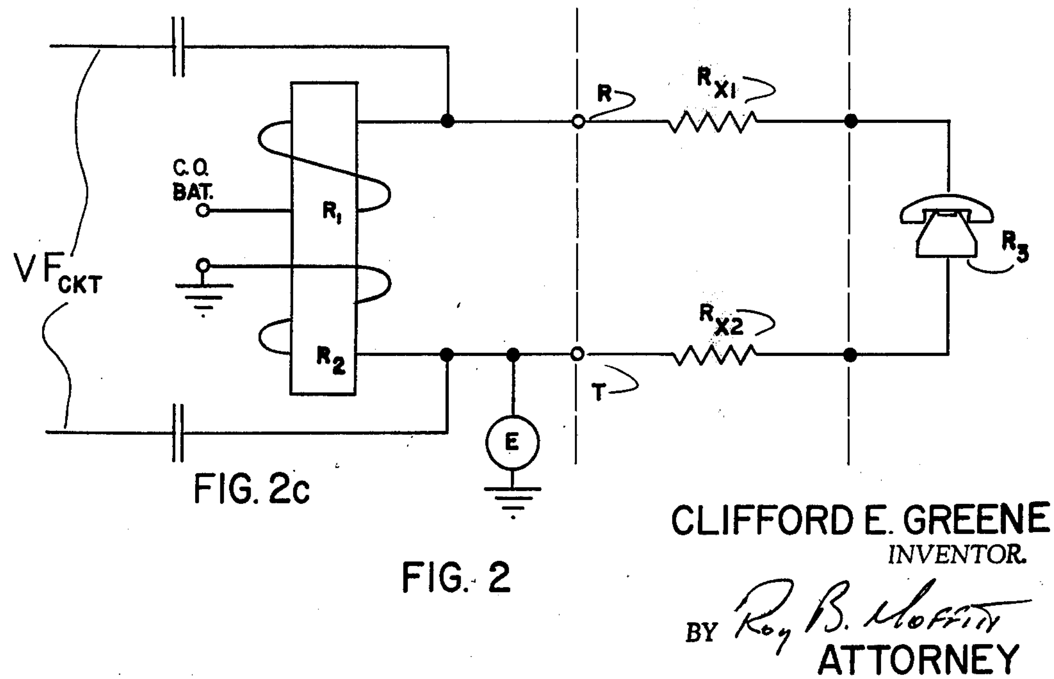
FIG. 2c
FIG. 2
CLIFFORD E. GREENE
INVENTOR.
BY Roy B. Moffitt
ATTORNEY

CLIFFORD E. GREENE
INVENTOR.

BY Roy B. Moore
ATTORNEY

SELF-ADJUSTING REPEATER FOR VOICE FREQUENCY TELEPHONE TRANSMISSION SYSTEMS

BACKGROUND OF THE INVENTION

Historically, control of telephone transmission losses in a telephone exchange area plant has been accomplished by selection of cable gauges, the larger gauge cables having lower loss. The first step past this rudimentary point was the use of loading coils, which tended to cancel the mutual capacitive reactance inherent with twisted cable pairs.

Because of economic factors, namely the increase cost of copper and spiraling construction cost, the present day trend is towards the smaller gauge cable and the use of electronic means to amplify and improve transmission of signals. This trend was made practical by the advent of the transistor, which allowed the development of physically small, highly reliable amplifying devices having a low power drain.

Ideally, transmission losses in telephone cables at 1 kHz should be maintained in the range of −3 db to −7 db. Inasmuch as the range of transmission losses, where amplifiers (repeaters) are applied, varies from approximately 7 db to an excess of 13 db, it is necessary to manually adjust the gain of each amplifier (repeater) to compensate for the loss inherent with the specific circuit on which it is to be installed. This approach presents several difficulties. If the gain is too high, the circuit approaches a "singing" condition having an adverse effect on the voice frequency return loss of the circuit, and producing a characteristic "hollow" sound. If the gain is too low, the required transmission improvement is not achieved. Either of these conditions can be present. Furthermore, the amplifier (repeater) can be misadjusted, or it can be installed on the wrong loop.

Accordingly, it is the object of the instant invention to provide an electronic amplifying means, which can be applied to a telephone subscriber circuit, and which will automatically adjust its gain to compensate for the transmission loss of most any particular circuit. The instant device can be applied indiscriminately to most loops, which would require amplifying (repeater) means, or can be shifted from circuit to circuit without the requirement of manual adjustment. By means of this device, a great deal of costly time consuming labor can be saved, which would normally be spent in specifying gain requirements and physically adjusting amplifiers (repeaters) with some predetermined fixed gain being installed on the wrong circuit with the adverse effects previously described. In conclusion, the use of the herein disclosed invention results in improved economy and transmission performance in telephone systems, thereby providing better and cheaper telephone service for telephone industry subscribers.

SUMMARY OF THE INVENTION

That which is disclosed hereinafter, presents a telephone automatic gain control repeater that automatically adjusts a.c. signal gain to compensate for loop transmission loss. In essence, the herein disclosed repeater contains two hybrids, connected to each other through a controllable attenuator and an amplifier, the controllable attenuator having a means for variably attenuating a.c. signals passing there through. One of the hybrids is connected to a central office and the other to a transmission line. That hybrid connected to a central office is adapted to pass a.c. signals from the central office to the controllable attenuator having the means for variably attenuating a.c. signals, which is responsive to a d.c. current flow through at least a portion of the controllable attenuator. A control means is provided that regulates the d.c. current flow and is connected to the controllable attenuator. This control means bridges a resistive means, which is in series with the transmission line, and is responsive to the voltage drop across it. Thus, whenever there is a decrease in voltage across the resistive means, the control means passes a proportionally decreased d.c. current flow through it and said controllable attenuator, thereby decreasing the attenuation of a.c. signals passing there through. Such an arrangement presents a.c. signals to an amplifier that is a function of the loop resistance.

Other objects, advantages and features of the present invention and a clear understanding thereof will become apparent from the following description of the repeater, one embodiment of which is represented schematically in the accompanying drawings wherein:

In the drawings:

FIG. 1 shows a plot of circuit loss in db (transmission loss) vs. loop resistance for loaded cable;

FIG. 2, comprising FIGS. 2*a* through 2*c* is a schematic of a normal telephone working subscriber loop;

DESCRIPTION OF THE PREFERRED EMBODIMENTS

Figure 1:
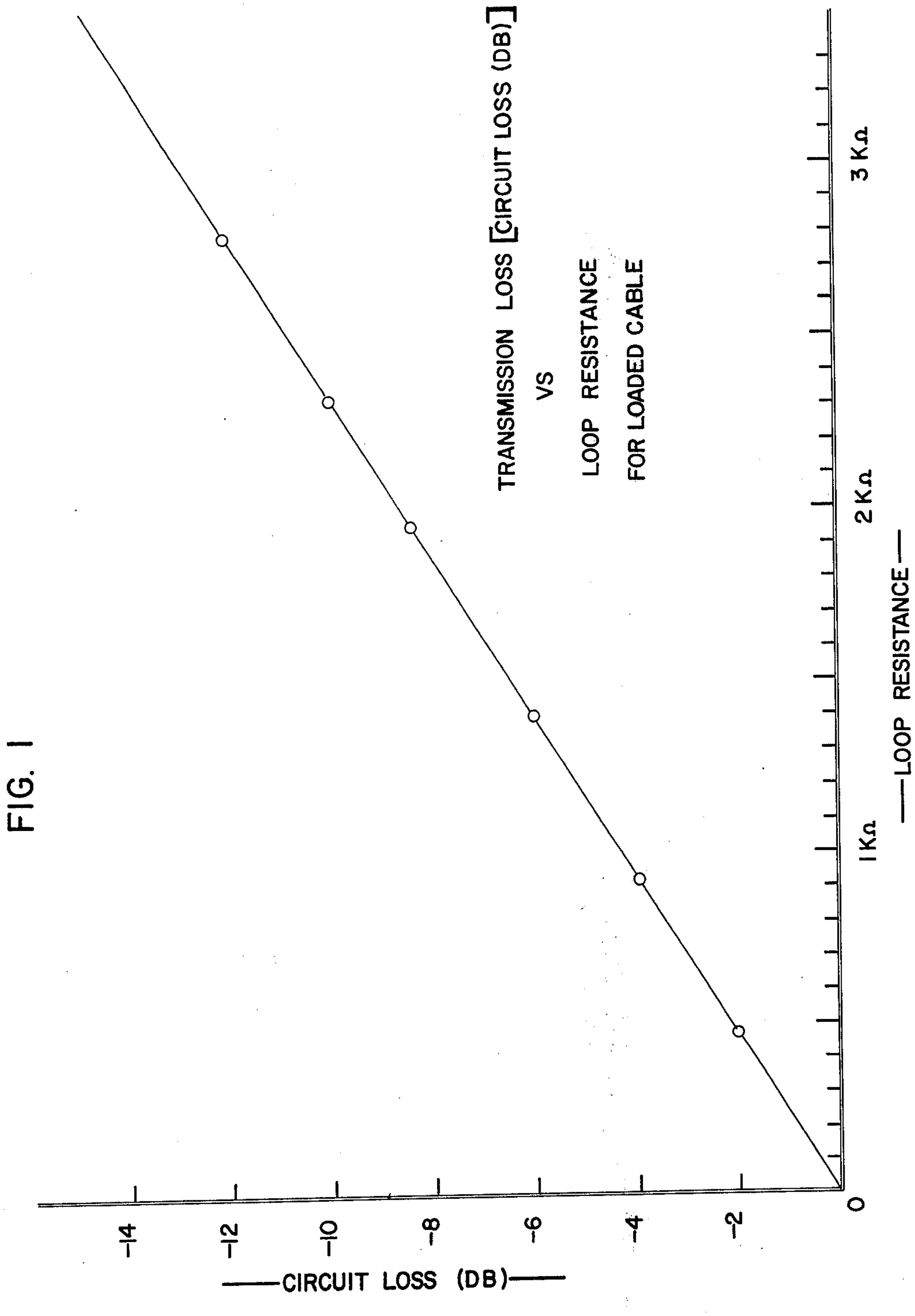

As a general rule, a.c. signal amplification is not used on unloaded (absence of loading coils) subscriber loops. The basic theory of loading is that the loading coils will essentially cancel the capacitive reaction of the cable. Attenuation, therefore, becomes largely a function of the d.c. resistance of the cable. Any loaded cable pair, regardless of gauge, should exhibit about the same transmission loss for a given loop resistance. This is the basis of those work sheets used to establish "Circuit Loss (db)" vs. "Loop Resistance", which are used in the telephone industry. FIG. 1 is an example of such work sheets.

If there was some way to dynamically measure the loop resistance of a circuit in use, this information, within practical bounds, could be used to automatically establish that gain required to meet a pre-established transmission level. Actually such information is available from a normal working subscriber loop, see FIG. 2*a*. If "E" is of known value, then by the simple application of Ohms Law ($R = E/I$), the total value of variable $R_1$ and $R_2$ can be delivered from the reading of $I$. FIG. 2B exemplifies an extension of this concept where $R_1$, $R_2$, $R_3$ and $E$ are all known qualtities. The reading $E_x$ can be equated to $R_{x1}$ plus $R_{x2}$ by the equation $R_{x1} + R_{x2} = [E/E_x/R_1] - (R_1 + R_2 + R_3)$.

FIG. 2*c* illustrates the principal where all of the elements presented in FIG. 2*b* are actually present in a typical subscriber line circuit associated with a telephone central office and its associated transmission circuitry. Here the voltage $E$ developed across a winding of the line relay bears a simple and predictable relationship to the loop resistance of the cable pair, as presented by $R_{x1}$ and $R_{x2}$, and thus, the voice frequency transmission loss between the central office and a subscriber telephone instrument.

It is well known that associated with every physical telephone circuit, there are two separate and distinct signal paths. First, there is a d.c. supervisory signal, which provides talking d.c. current and the switching and supervisory control function for the associated central office switching circuits. Second, there is the voice transmission path. As previously pointed out, there is a distinct and predictable relationship between loop resistance and voice frequency loss and loaded plant.

It is quite obvious, from an inspection of the schematics in FIGS. 2*c*, 3, 4 and 5, that the d.c. loop current from a battery voltage source will vary with the length (resistance) of transmission line and conductors, when a telephone subscriber is in the "off-hook" condition. The voltage across a resistance in series with these transmission lines will vary in exact proportion to conductor length. This proportional voltage drop, across a resistance in series with a transmission line, is sensed by a control means that proportionally applies a d.c. current flow to a portion of a controllable attenuator, which is inserted in the voice frequency transmission path between hybrids. Thus, it is the d.c. current flow through a portion of the controllable attenuator that establishes the attenuation of the attenuator to a.c. signals passing there through. It is this attenuation that sets the gain of the a.c. signals so as to compensate for the line loss.

Figure 3:
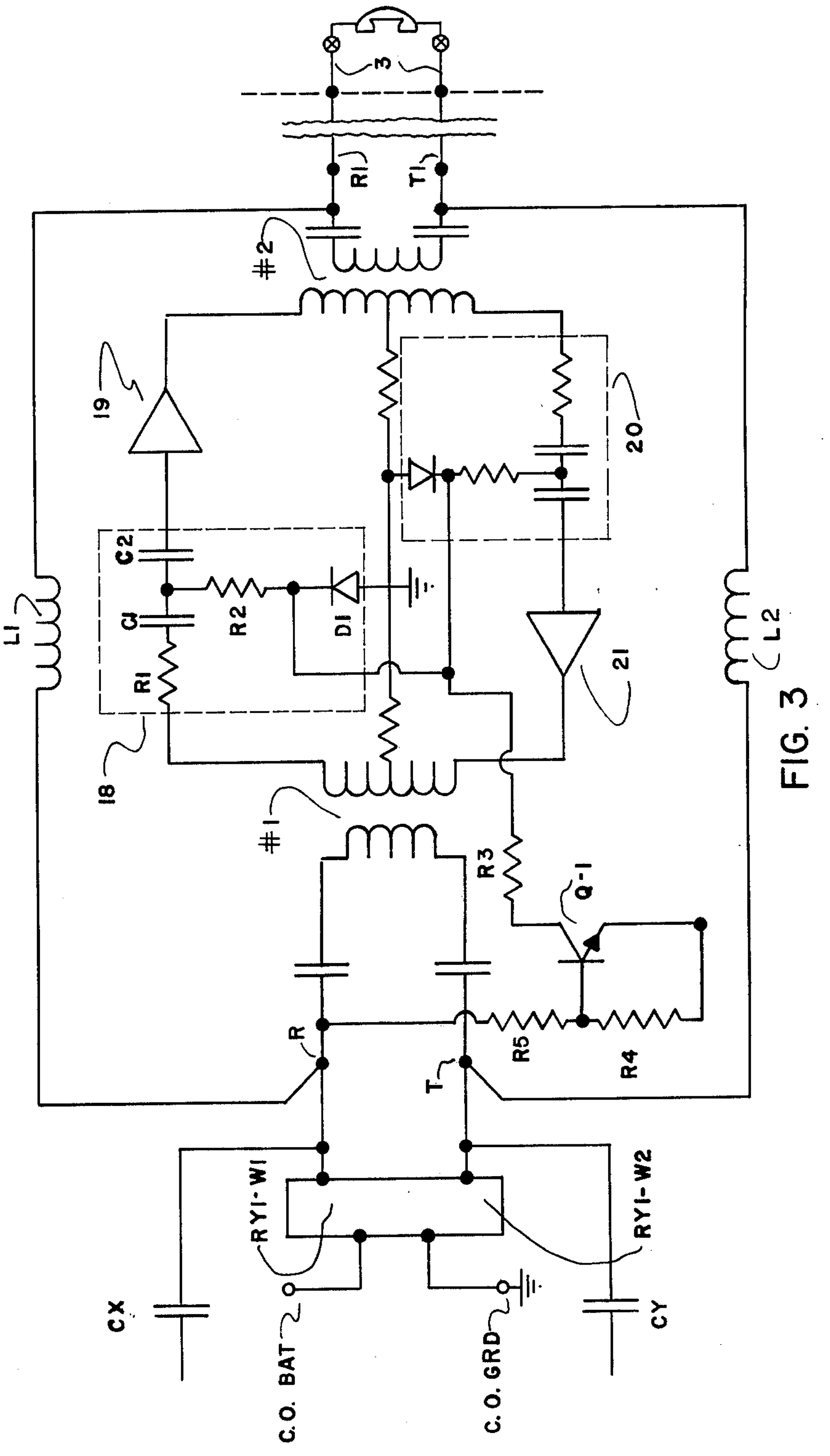
FIG. 3 is a specific embodiment of a herein disclosed repeater in a telephone circuit.

In FIG. 3 there is shown one exemplification (embodiment) of the instant invention. The circuitry between T and R and T1 and R1 comprises a two-way hybrid amplifier plus the necessary control and controllable elements to accomplish the results previously outlined. Inductors Ll and L2 serve to provide a low-resistive path for d.c. signaling while providing a high impedance to voice frequency signals between T–R and T1 and R1. When the subscriber instrument comes off-hook, the circuit from the central office battery (C.O.) through RY1–W1, L1, R1 side of subscriber cable pair 3, subscriber instrument, T1 side of cable pair 3, L2, RY1–W2, to central office ground is completed.

A voice frequency signal from another circuit, coupled through capacitors CX and CY (part of central office switching equipment) to T and R, would enter hybrid number 1, go through the other upper secondary winding and would enter an L-pad attenuator 18, comprising series element R1 and a controllable shunt portion made up of resistor R2 and diode D1. Capacitors C1 and C2 act to pass voice frequencies and block d.c. Diode D1 has a characteristic such that the more d.c. current flowing through it, the lower its dynamic impedance. An a.c. signal appearing at the junction of C2 and amplifier 19, would be amplified by a fixed amount and coupled through hybrid number 2 to terminals T1–R1. The amplified signal would be attenuated by this fixed amount by the loss caused by the cable pair before reaching the subscriber telephone instrument. The reciprocal path from the instrument aforesaid to the cable pair 3, hybrid number 2, controllable attenuator 20, amplifier 21, hybrid number 1 would act in a like manner.

The controllable feature of this particular embodiment works in the following manner. As shown, there is a positive voltage drop across RY1–W1 of a measurable voltage. This is applied to the base connection of NPN transistor Q-1 through resistor R5 as a "turn-on" bias. The collector current of Q-1 is drawn from ground through diode D1 and resistor R3. If the loop resistance of R1 is increased, the current through RY1–W1 will decrease, which will decrease the voltage drop across W1 and lower the base bias of Q-1. This will, in turn, cause Q-1 to draw less collector current through D1 and R2. Consequently, this decrease of current flow through D1 will increase D1's dynamic impedance, thereby decreasing the attenuation of controllable attenuator 18 to the a.c. signal passing there through, thus increasing the over all gain between R–T and T1–R1. Conversely, shortening the loop (lowering its resistance) would result in an increase bias on transistor Q-1 and consequently an increase current through diode D1. This increase current would, in turn, increase the attenuation to a.c. signals passing through controllable attenuator 18, thereby resulting in a decrease in net gain. By proper selection of R1, R2, R3, R4, R5, Q-1 and D1, it is possible to very closely establish the controllable gain characteristics, so that they compensate for the loss in the cable as established by its loop resistance.

Controllable element diode D1 could be a varistor, a saturable reactor, or a transistor. The loop current sensing means could be any resistive element, which might be inserted in series with the loop. The line relay could be located at T1–R1 as part of the device rather than part of the central office equipment.

Figure 4:
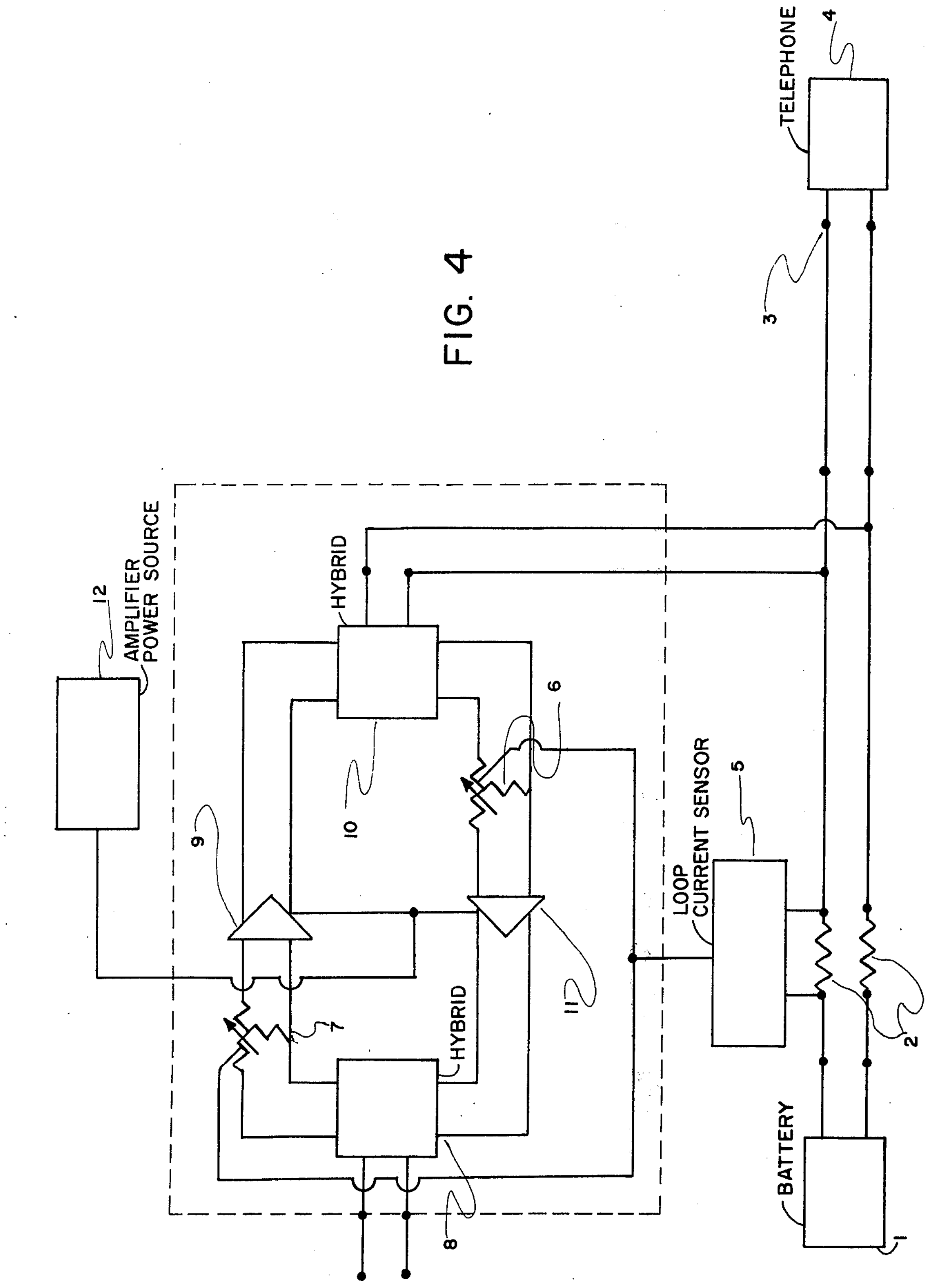
FIG. 4 is a block schematic showing another embodiment of the use of a repeater in a telephone circuit.
Figure 5:
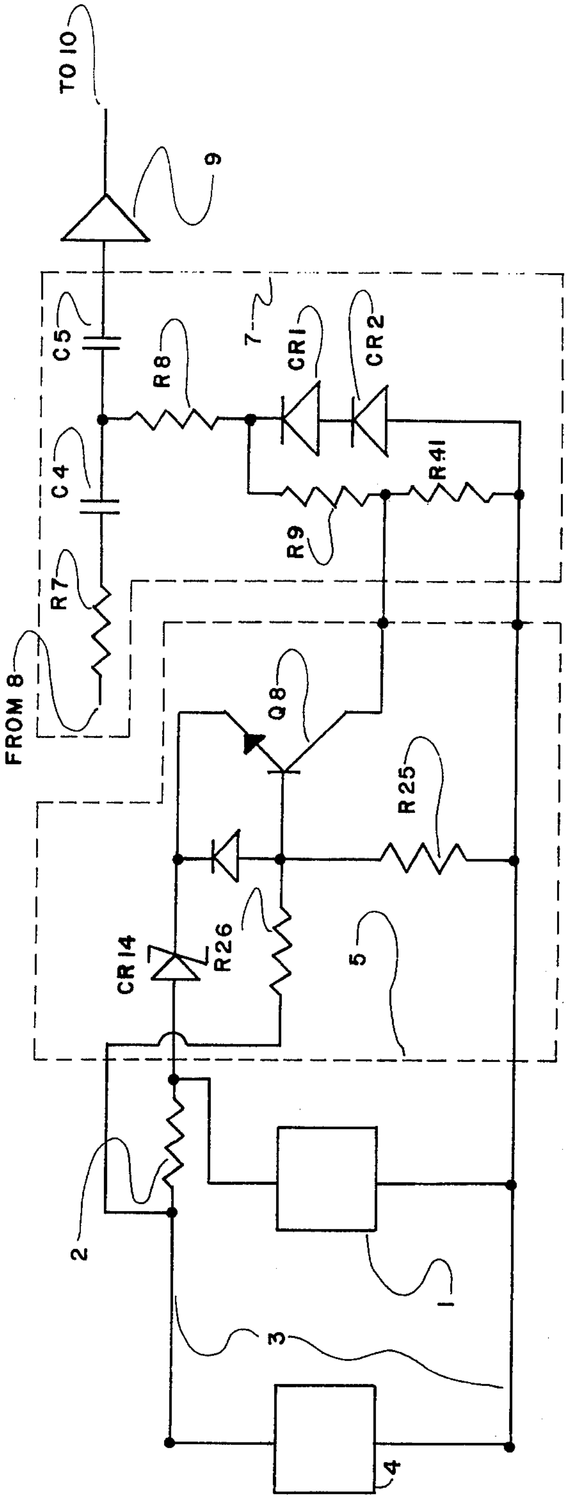
FIG. 5 is a detailed schematic of the repeater shown in FIG. 4.

In FIGS. 4, and 5, there is shown a further embodiment of the instant invention, employing the same principal as that shown by FIG. 3 supra. In FIGS. 4 and 5, the following reference numbers serve to identify indicated components: 1 — talking battery power source; 2 — resistive element; 3 — transmission conductors; 4 — telephone instrument; 5 — loop current sensor; 6 — first controllable attenuator; 7 — second controllable attenuator; 8 — first hybrid; 9 — first amplifier; 10 — second hybrid; 11 — second amplifier; and, 12 — amplifier power source. When the subscriber telephone 5 is in an off-hook condition, current from the central office battery 1 will flow through the transmission lines 3, the resistive elements 2, and in the telephone instrument 4. A positive voltage drop across resistive elements 2 will be applied to resistor R26 to the base of transistor Q8 (see FIG. 5). Base bias resistor R25 places transistor Q8 in a low current conduction mode. Once the voltage drop across resistive element 2 exceeds the zener voltage of zener CR14, plus the base emitter drop of transistor Q8, then transistor Q8 begins conducting more current, this current being proportional to the voltage drop across resistive means 2. This proportional current is applied to controllable attenuator 7.

Resistor R7 serves as the series leg of an L-attenuator, the shunt leg of which is composed of resistor R8 in series with the series combination of resistors R9, transistor Q8, and diodes CR1, CR2. Capacitors C4 and C5 provide d.c. isolation for the VF transmission path. Diodes CR1 and CR2 are the dynamic control elements of controllable attenuator 7.

The proportional collector current of transistor Q8, flowing through the branch occupied by resistor R9, zener CR1 and CR2 serves to change the dynamic impedance of zeners CR1 and CR2. This change in dynamic impedance in the shunt leg of the attenuator serves to change the attenuation of the VF signal path from hybrid 8 (not shown in FIG. 5 but shown in FIG. 4) to fixed gain amplifier 9.

Resistors R26, R25, R9, R8 and R41 are so proportioned that their attenuation is essentially linear over a loop resistance range from 1000 to 3000 ohms. The gain of the amplifier 9 and attenuation of controllable attenuator 7 are designed to maintain an average circuit loss of approximately 5 db at a voice frequency over the designed resistance range.

To those skilled in the art to which this invention relates, many changes in the construction and widely different embodiments and applications of the invention will suggest themselves without departing from the spirit and scope of the invention. The disclosure and the description herein are purely illustrative and are not intended to be in any sense limiting.

For at least the purposes of the claims herein, reference to the telephone transmission line as being loaded signifies that sufficient amount of inductance has been introduced and properly distributed to effectively cancel capacitive losses of the transmission line cable for a given range of frequencies.

I claim:

1. In a voice frequency telephone transmission system, a voice frequency repeater having a signal-transmitting circuit which includes an amplifier for amplifying voice frequency signals and controllable means for varying the gain which the circuit provides between its input and output terminals, a telephone, a loaded two-conductor transmission line providing a connection between said circuit and said telephone for transmitting the voice frequency signals, said repeater being connected to the central office end of said line, and means electrically connected to said line and said controllable means and controlling said controllable means to provide said circuit with an amount of gain that maintains the transmission loss of said signals approximately constant regardless of the length of said line or the gauge of the transmission line conductors whenever the loop resistance of said line is within a predetermined range of resistances.

2. In a voice frequency telephone transmission system having a telephone, a voice frequency repeater adapted to be connected to a central office for passing voice frequency signals, a loaded two-conductor transmission line providing a connection between said repeater and said telephone for transmitting the voice frequency signals between said telephone and said repeater, said telephone being connected across the conductors of said line, and a d. c. voltage source electrically connected to said line and feeding direct current through the loop defined by the conductors of said line and said telephone to provide said direct current with a magnitude which is closely indicative of the reciprocal of the d.c. resistance of said loop, a variable gain amplifier circuit forming a part of said repeater for amplifying said signals in each direction of transmission, and means under the control of the magnitude of said direct current for making the gain of said amplifier circuit a function of the resistance of said loop to maintain the transmission loss of said signals approximately constant regardless of the length of said line or the gauge of said transmission line conductors whenever the loop resistance of said line is within a predetermined range of resistances.

3. The voice frequency telephone transmission system defined in claim 2 wherein said amplifier circuit comprises fixed gain amplifier means for amplifying said signals and controllable attenuator means for variably attenuating said signals, and wherein said gain controlling means comprises a control circuit connected to said attenuator means, said attenuator means being controlled by said control circuit to attenuate said signals by an amount that is a function of said direct current.

4. The voice frequency telephone transmission system defined in claim 2 wherein said amplifier circuit comprises first and second fixed gain amplifiers and first and second controllable attenuators respectively connected to said first and second amplifiers, said first amplifier and said first attenuator respectively amplifying and attenuating the voice frequency signals being transmitted in one direction, and said second amplifier and said second attenuator respectively amplifying and attenuating the voice frequency signals being transmitted in the opposite direction, and wherein said gain controlling means comprises a component having a resistance connected between said source and at least one of the conductors of said line to provide a voltage drop that varies in accordance with magnitude of said direct current, and a control circuit connected to said line and to said first and second attenuators for providing for a regulated flow of direct current through a control portion of each of said attenuators, said control circuit being effective to provide the direct current flowing through each attenuator control portion with a magnitude that is a function of said voltage drop, and each of said attenuators being effective to attenuate the voice frequency signals for its associated direction of transmission by a magnitude that is a function of the magnitude of the direct current flowing through its control portion.

5. A method of rendering a voice frequency repeater self-adjusting to different telephone transmission line lengths and/or different transmission line conductor gauges in a voice frequency telephone transmission system in which a two-conductor transmission line provides a connection between a telephone and said repeater for transmitting signals in opposite directions, in which said telephone is connected across the conductors of said line, in which said repeater is connected to the central office end of said transmission line, and in which amplifiers in said repeater have fixed preselected gains for amplifying said signals in both directions of transmission, said method comprising the steps of loading said transmission line so that the transmission loss of signals transmitted by said line is substantially exclusively a function of resistance, feeding a direct current through the loop defined by the conductors of said line and said telephone to provide said direct current with a magnitude which is closely indicative of the reciprocal of the resistance of said loop, sensing the magnitude of said direct current, and variably attenuating said signals in each direction of transmission at said repeater by an amount determined by the sensed magnitude of said direct current to provide said repeater with a net gain that maintains the transmission loss of said signals approximately constant regardless of the length of said line or the gauge of said conductors whenever the loop resistance of said line is within a predetermined range of resistances.

6. In a voice frequency telephone system having a telephone, a voice frequency repeater, a two-conductor transmission line providing a connection between said telephone and said repeater for transmitting signals between said repeater and said telephone, said line being loaded so that the transmission loss of transmitted signals is substantially exclusively a function of resistance, said repeater being connected to the central office end of said line and having a signal-transmitting circuit which has a variable gain and which includes an amplifier for amplifying said signals, a d.c. voltage source connected to the central office end of said line for feeding direct current through the loop defined by the conductors of said line and said telephone, and a control circuit connected to said line and to said signal-transmitting circuit and controlling the gain of said signalling-transmitting circuit as a function of the magnitude of said direct current to provide said gain with a value which maintains the transmission loss of said signals approximately constant regardless of the length of said line or gauge of said conductors whenever the loop resistance of said line is within a predetermined range of resistances.

7. In a voice frequency telephone transmission system having a telephone, a voice frequency repeater, a two-conductor transmission line providing a connection between said repeater and said telephone for transmitting voice frequency signals in at least one preselected direction of transmission, said repeater being connected to the central office end of said line, and said telephone being connected across the conductors of said line, said transmission line being loaded to make the transmission loss of signals transmitted by said line substantially exclusively a function of resistance, a d.c. voltage source electrically connected to said line to feed direct current through the loop defined by the transmission line conductors and said telephone to provide said direct current with a magnitude which is closely indicative of the reciprocal of the resistance of said loop, an amplifier forming a part of said repeater and providing a predetermined gain for amplifying said signals, means for sensing the magnitude of said direct current, and a controllable attenuator forming a part of said repeater and controlled by said sensing means for attenuating said signals by an amount determined by the magnitude of said direct current to provide said repeater with a net gain that maintains the transmission loss of said signals approximately constant regardless of the length of said line or the gauge of said transmission line conductors whenever the loop resistance of said line is within a predetermined range of resistances.

8. A method of rendering a voice frequency amplifying repeater self-adjusting to different telephone transmission line lengths and/or different transmission line conductor gauges in a voice frequency telephone transmission system in which a transmission line having a pair of conductors provides a connection between a telephone and said repeater for transmitting voice frequency signals in at least one preselected direction of transmission, in which said telephone is connected across said conductors, in which an amplifying circuit of the repeater provides a predetermined gain for amplifying said voice frequency signals, and in which said repeater is connected to the central office end of said line, said method comprising the steps of loading said transmission line to make the transmission loss of signals transmitted by said line substantially exclusively a function of resistance, feeding a direct current through the loop defined by said conductors and said telephone to provide said direct current with a magnitude that is closely indicative of the reciprocal of the resistance of said loop, and attenuating said voice frequency signals at said repeater by an amount that is a function of the magnitude of said direct current to provide said repeater with a net gain that maintains the transmission loss of said signals approximately constant regardless of the length of said line or the gauge of said conductors whenever the loop resistance of said line is within a predetermined range of resistances.

* * * * *